United States Patent [19]

Bogusch

[11] Patent Number: 4,818,407
[45] Date of Patent: Apr. 4, 1989

[54] NITRIFICATION WITH AMMONIA ENRICHMENT

[76] Inventor: Eugene D. Bogusch, 1421 Bolson Dr., Downers Grove, Ill. 60516

[21] Appl. No.: 842,982

[22] Filed: Mar. 24, 1988

[51] Int. Cl.$^4$ ................................................ C02F 3/12
[52] U.S. Cl. ..................................... 210/614; 210/610; 210/903
[58] Field of Search ............... 210/614, 605, 630, 903, 210/610, 611, 96.1; 435/268, 264

[56] References Cited

U.S. PATENT DOCUMENTS

| 2,562,510 | 7/1951 | Schlenz | 210/610 |
| 3,871,999 | 3/1975 | Torpey | 210/630 |
| 4,437,992 | 3/1984 | Saito et al. | 210/614 |

FOREIGN PATENT DOCUMENTS 0070592 1/1983 European Pat. Off. ............ 210/614
58-45913 10/1983 Japan ................................... 210/614

Primary Examiner—Benoit Castel
Attorney, Agent, or Firm—Augustus G. Douvas

[57] ABSTRACT

A process is disclosed to improve the efficiency of nitrification in activated sludge systems. Supplemental ammonium nitrogen in the form of anhydrous ammonia or an aqueous solution of ammonia is added to the nitrification zone preferably during periods of low flow and low loadings of oxidizable nitrogenous compounds. The ammonium nitrogen addition is controlled by monitoring the ammonium nitrogen concentration of the activated sludge mixed liquor exiting the nitrification zone. The supplemental ammonium nitrogen causes an increase in the population of the nitrifying bacteria which results in an increased capacity for nitrification. The increased efficiency obtained will result in increased reliability of nitrification and lower effluent nitrogen concentrations.

8 Claims, 1 Drawing Sheet

NITRIFICATION WITH AMMONIA ENRICHMENT

FIELD OF INVENTION

This invention relates to a process to improve the biological oxidation of ammonium nitrogen in wastewater treatment systems.

RELATED PATENT

The invention described in this specification is related to the subject matter of U.S. Pat. No. 4,705,633 issued Nov. 10, 1987 for Nitrification With Sludge Reaeration and Ammonia Enrichment.

BACKGROUND OF THE INVENTION

Removal of ammonium nitrogen from wastewater is highly desirable because ammonium nitrogen exerts an oxygen demand in the receiving water, inhibits the disinfection of a wastewater, is toxic to aquatic life and is a nutrient contributing to eutrophication of natural waters. Many wastewater treatment facilities are now required to remove ammonium nitrogen from their effluents in the interest of environmental protection. Ammonium introgen removal may be accomplished by biological nitrification. Nitrification is the oxidation of ammonium nitrogen to nitrate nitrogen by nitrifying autotrophic bacteria. Complete nitrogen removal may be achieved by subsequent denitrification which is the reduction of nitrate nitrogen to molecular nitrogen by facultative heterotrophic bacteria under anoxic conditions.

The activated sludge process in its most common adaptations stabilizes wastewater biologically under aerobic conditions. Carbonaceous material in the wastewater is used as substrate for growth by microorganisms. The biological solids formed during the aeration of the sewage are separated in a sedimentation tank and recycled back to the aeration tank to continue the process. Excess biological solids are removed from the system as required. Some variations of the activated sludge process commonly in use are conventional aeration, step feed aeration, complete mix aeration, extended aeration, high rate aeration, contact stabilization and the pure oxygen system. Most modifications of the activated sludge system were developed primarily for the removal of suspended material and the oxidation of carbonaceous material by heterotrophic bacteria.

It is possible to achieve nitrification in almost any activated sludge system provided that conditions are adequate to maintain a population of the nitrifying autotrophic bacteria. These conditions include sufficient dissolved oxygen, carbonate alkalinity in excess to maintain appropriate pH and an adequate solids retention time. Nitrifying bacteria have a relatively low growth rate which generally prevents significant nitrifying populations from occuring in activated sludge systems with short solids retention times. Since the low growth rate of the nitrifying bacteria is further decreased with decreased temperature, the minimum solids retention time required to maintain a sufficient nitrifier population will increase as temperature decreases.

Wastewater treatment plants generally operate under variable conditions of flow, wastewater strength and temperature. Because of the dynamic conditions a treatment plant may be subjected to, a nitrifying activated sludge plant is usually designed to be able to maintain a solids retention time much greater than the minimum that would be required for steady-state operation under the most severe conditions encountered. Long solids retention times permit the buildup of a nitrifying population to a level which approaches the maximum attainable for the amount of ammonium nitrogen substrate available.

As a consequence of the ability to maintain long solids retention times, nitrifying activated sludge systems are usually characterized by low carbonaceous loadings and long hydraulic retention times. To maintain the long solids retention times and long hydraulic retention times nitrifying activated sludge systems often are much larger in size than non-nitrifying systems. The design and maintenance of nitrifying activated sludge systems under dynamic conditions is discussed in detail in the Process *Design Manual for Nitrogen Control*, U.S. Environmental Protection Agency, U.S. EPA Technology Transfer, Washington, D.C., 1975, and Poduska, R. A. and Andrews, J. F., "Dynamics of Nitrification in the Activated Sludge Process," *Journal Water Pollution Control Federation*, Volume 47, pages 2599–2619, 1975.

Granted adequate dissolved oxygen and non-inhibiting pH levels, nearly complete ammonium nitrogen removal can be maintained in nitrifying activated sludge systems except under stressful conditions including the following:

1. An increased wastewater flow through the system resulting in an insufficient hydraulic retention time for complete ammonium nitrogen oxidation.
2. An increased ammonium nitrogen loading to the system which may be too high for complete ammonium nitrogen oxidation.
3. Decreased wastewater temperatures which cause loss of nitrification efficiency at the solids retention time maintained in the system.
4. An increased carbonaceous loading to the system which results in a decreased solids retention time and decreased nitrification.

It is the object of this invention to improve nitrification in activated sludge systems thereby increasing nitrification reliability and reducing effluent ammonium nitrogen concentrations, particularly during periods of stressed operation.

SUMMARY OF THE INVENTION

The variable conditions of flow and wastewater strength that most treatment plants operate under are due to normal diurnal changes in wastewater production from both industrial and domestic sources, and changes due to wet weather flow. Generally when dry weather flow is high a plant is stressed because of low hydraulic retention times and high loadings of carbonaceous material and ammonium nitrogen. Under these conditions ammonium nitrogen utilization rates and nitrifier growth rates are highest. But at maximum nitrifier growth rates nitrification efficiency, as measured by percent ammonium nitrogen removal or effluent ammonium nitrogen concentrations, may decrease if the ammonium nitrogen loading exceeds the system's capacity to oxidize ammonium nitrogen. However, nitification efficiency is highest when ammonium nitrogen substrate is limited as is generally encountered under conditions of low flow and low ammonium nitrogen loadings.

In the process of this invention, supplemental ammonium nitrogen in the form of anhydrous ammonia or an aqueous solution of anhydrous ammonia is added to the nitrification zone at a controlled rate preferably during periods of low flow and low ammonium nitrogen loading in order to produce a higher nitrifier population without an increase in solids retention time. The higher nitrifier population produces a higher maximum ammonium nitrogen substrate utilization rate which increases overall process efficiency. The additional ammonium nitrogen will not cause any adverse change in the removal of suspended solids or biochemical oxygen demand in the activated sludge process. If the ammonium nitrogen concentration at the effluent end of the nitrification zone rises above a predetermined level then the supplemental ammonium nitrogen addition is terminated. The process can be controlled to increase the total nitrifier population to the extent desired by adjusting the average amount of supplemental ammonium nitrogen on a daily basis. If alkalinity is limted than pH control in the nitrification zone must be maintained. Further objects and advantages of my invention will become apparent from consideration of the drawing and ensuing description therein.

BRIEF DESCRIPTION OF THE DRAWING

The FIG. is a schematic diagram of a nitrifying activated sludge system illustrating one embodiment of the process of this invention.

DESCRIPTION OF THE PREFERRED EMBODIMENTS

Figure 1:
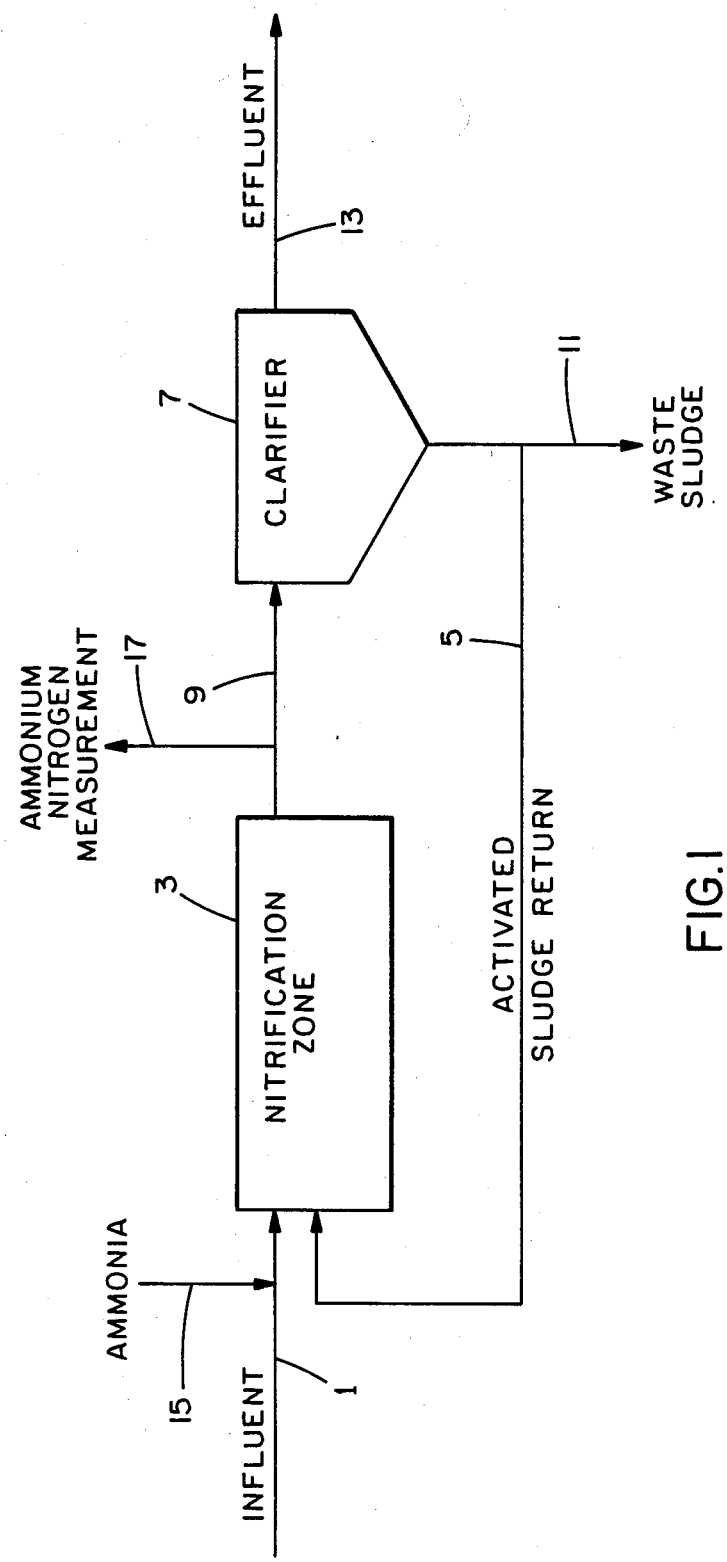

The FIG. shows a typical example of the process of this invention deployed in a nitrifying activated sludge system. However, the scope of this invention is not limited to this example. The wastewater flowing through conduit 1 to the nitrification zone 3 may have undergone preliminary treatment such as screening, grit removal and primary sedimentation. In a separate stage nitrification system the influent wastewater will have already undergone treatment for removal of carbonaceous material in for example a preceding activated sludge system, a tricking filter or a rotating biological contactor.

The nitrification zone 3 may be any type of activated sludge aeration basin in which some degree of nitrification of the wastewater can be achieved. This includes plug flow and completely mixed aeration tanks. It may include for example activated sludge process variations such as conventional aeration, step feed aeration and extended aeration systems. Also included are mechanically aerated systems, diffused air systems and systems utilizing oxygen enriched gases or pure oxygen. The nitrification zone 3 may be immediately preceeded or followed by other treatment steps such as anoxic denitrification. Generally, the nitrification zone 3 should be considered to be a step in any simple or complex suspended growth treatment process capable of sustaining nitrification of the wastewater under treatment.

In the example shown in the FIGURE the wastewater supplied through conduit 1 and the recycled activated sludge transported by conduit 5 are continuously introduced into the nitrification zone 3 and kept under aeration. The mixed liquor from the nitrification zone 3 is conveyed to the clarifier 7 by conduit 9. The solids in the mixed liquor from the nitrification zone 3 are settled out in the clarifier 7 and recycled to the influent end of the nitrification zone 3. Excess biological solids are removed from the system by conduit 11 as required. The clarified wastewater is directed through conduit 13 to other treatment processes, if any.

For most applications, the wastewater flow into the nitrification zone 3 should be determined before ammonia enrichment. Since response to hydraulic loading is immediate throughout a plant, flow measurement of the raw wastewater incoming to the plant may be utilized in lieu of flow measurement at the influent end of the nitrification zone 3, provided that the entire plant flow is directed through the nitrification zone 3. If the wastewater flow is too high, supplemental addition of ammonium nitrogen is inadvisable since the hydraulic retention time may be too short to oxidize the additional ammonium nitrogen loading without causing a significant increase in the influent ammonium nitrogen concentrations. It is preferable that the flow be about or below the average flow to the nitrification zone 3.

A sample of mixed liquor is withdrawn from the nitrification zone 3 at or near the effluent end. It is preferable to remove suspended solids from the sample to suppress biological activity and facilitate analysis. Sufficient solids can usually be removed rapidly by ordinary sedimentation in a sample container and decanting the clarified wastewater. The ammonium nitrogen concentration is then measured, preferably by the ammonia-selective electrode method.

Having established an effluent ammonium nitrogen concentration of less than about 2 mg/l, supplemental ammonium nitrogen addition to the nitrification zone 3 may proceed. In the example shown in the FIGURE ammonia is utilized as the source of the ammonium nitrogen. Ammonia is added at a controlled rate through line 15 to the influent wastewater in conduit 1. The ammonia may also have been added directly into the influent end of the nitrification zone 3. If noncontinuous sampling and analysis is utilized then the effluent ammonium nitrogen concentration should be checked at regular intervals, perhaps hourly. If the effluent ammonium nitrogen concentration increases beyond a predetermined acceptable level of perhaps about 2 mg/l then the ammonium nitrogen addition should be discontinued. Provided with low effluent ammonium nitrogen concentrations, the ammonium nitrogen addition should be continued until a target amount has been added.

In a partially automated operational mode microprocessor control of supplemental ammonium nitrogen addition may be utilized based on influent wastewater flow. This operational mode will yield immediate response to changes in flow through the nitrification zone 3. Manual sampling and analysis of ammonium nitrogen may be maintained with a manual override control of the supplemental ammonium nitrogen feed whenever effluent ammonium nitrogen concentrations exceed the predetermined acceptable level.

The ammonium nitrogen enrichment process may also be completely automated. The effluent ammonium nitrogen may be analyzed with a continuous on-line ammonia analyzer employing for example the ammonia-selective electrode method. A continuous sample may be withdrawn from the effluent end of the nitrification zone 3. A mini-settling device may be used in the nitrification zone 3 to separate the majority of the suspended solids from the sample. Such a device may be for example a single steeply inclined settling tube suitably baffled to prevent rising air bubbles from entering the tube. An additional sedimentation or filtration step may be required after the sample is withdrawn from the nitrification zone 3. Solids removal is important to prevent clogging of sampling lines and fouling of the gas permeable membrane. Microprocessor control may be used to activate the ammonium nitrogen addition at preprogrammed rates in response to input signals from the influent flow metering instrumentation and the on-line ammonia analyzer.

The preferred source of ammonium nitrogen is anhydrous ammonia. Ammonia is extremely soluble in water and is rapidly ionized to ammonium nitrogen at the near neutral pH of most wastewaters. The alkalinity of an ionized ammonia solution will help to reduce the acidity produced from the nitrification process. Ammonia may be utilized in either its gaseous or liquified states or in a concentrated aqueous solution. Compared to alternate sources of ammonium nitrogen such as ammonium salts, anhydrous ammonia offers the advantages of low cost, widespread availability, highest ammonia content, ease of use and compact storage.

Since nitrification produces acidity and reduces alkalinity, pH control may be required for wastewaters with insufficient alkalinity. The ammonium nitrogen enrichment may increase the need for pH control. Lime is generally the chemical of choice for pH and alkalinity control in nitrification systems.

Typically a plant should plan to increase the nitrifying population anywhere from about 5 to 40 percent depending on the level of improvement in nitrification efficiency sought. For large population increases it may be necessary to increase the ammonium nitrogen addition gradually since some time will be required for the buildup of the nitrifying population. The increased nitrification efficiency caused by the ammonium nitrogen enrichment will also cause an additional increase in the total nitrifier population because of a more complete utilization of the naturally occurring ammonium nitrogen substrate.

Assuming a typical diurnal flow pattern, the ammonium nitrogen enrichment may be accomplished in about 1 to 12 hours. If for example the ammonium nitrogen enrichment is set at a constant rate equal to one-half of the average ammonium nitrogen loading to the plant, a 20 percent enrichment addition would require 9.6 hours. The analysis of ammonium nitrogen in the nitrification zone 3 would only be necessary while the ammonium nitrogen enrichment is occurring and perhaps for as much as one hydraulic retention time afterwards in plug flow tanks. Several addition strategies are possible and can be planned to minimize cost and personnel requirements.

A treatment plant cannot utilize the process of this invention unless it is achieving nearly complete nitrification during diurnal periods of low flow and low nitrogenous loadings. Plants with limited nitrification zone 3 capacity frequently experience loss of nitrification efficiency during diurnal periods of peak flow and high nitrogenous loadings. During these periods hydraulic retention time is lowest. Because of limited nitrification zone 3 capacity the plant may not be able to maintain the longer solids retention times required to maintain efficient nitrification under the dynamic conditions of variable flow and loading. Enrichment with ammonium nitrogen will increase the nitrifying population without increasing the solids retention time. Ammonium nitrogen enrichment in accord with the process of this invention will tend to equalize the ammonium nitrogen loading with respect to time allowing the plant to operate more efficiently at all solids retention times greater than the minimum required for nitrification under steady-state conditions.

Nitrifying plants in northern climates may find that utilization of this process only during cold weather can significantly upgrade their performance. Since the growth rate of the nitrifying bacteria is decreased with decreased temperature, the minimum solids retention time required to maintain an adequate nitrifying population for efficient nitrification is increased. The same operational principles apply for plants stressed by cold weather as for plants with limited nitrification zone 3 capacity. Ammonium nitrogen enrichment produces a greater nitrifier population which results in greater nitrification efficiency.

A plant with marginal nitrification is often more vulnerable to upset caused by variable flow or nitrogeneous loadings to the nitrification zone 3. The ammonium nitrogen enrichment process can make plants more resistant to such upsets. For example, decreased nitrogeneous loadings to the plant over an extended period of several days will result in a decreased nitrifier population. Decreased nitrification efficiency may occur when the plant experiences more typical nitrogenous loadings. The ammonium nitrogen enrichment process can be controlled to increase ammonium nitrogen addition as required to maintain a more constant nitrifier population.

For nitrifying plants normally achieving low effluent ammonium nitrogen concentrations the process of this invention may provide additional protection whether operated on a year-round basis or just held in reserve to respond to the occasional periods stressed operation or slipping nitrification efficiency. It should be understood however that this process will not be effective in activated sludge systems with a hostile growth environment caused by inhibiting pH, inhibiting dissolved oxygen levels or substances inhibiting or toxic to nitrifying bacteria.

Typical effluent sampling does not indicate how poor nitrification may be during periods of peak flow and high nitrogenous loadings. Grab sampling may miss these periods entirely. Non-flow proportioned composite sampling tends to overstate nitrification efficiency, and flow proportioned composite sampling only yields average performance over the sampling period. When assessing the environmental effects of treatment plant effluents the highest effluent ammonium nitrogen concentrations should be considered.

In the foregoing description the process of this invention has been described with reference to certain particular preferred embodiments, though it is to be understood that the specific details shown are merely illustrative and that the process of this invention may be carried out in other ways without departing from the true spirit and scope of the appended claims.

What is claimed is:

1. In an activated sludge process for the nitrification of wastewater including a nitrification zone through which the wastewater is continuously passed while being aerated in the presence of activated sludge at a pH of about 6 to 9, and a clarifier in which the nitrified wastewater from the nitrification zone is clarified, the improvement for controlled enrichment of the nitrification zone with ammonium nitrogen comprising:

(a) a step of measuring the ammonium nitrogen concentration in the wastewater and activated sludge mixed liquor at an outlet of the nitrification zone, and (b) a step of adding an ammonium nitrogen enriching agent consisting essentially of anhydrous ammonia to an inlet of the nitrification zone at a controlled rate restricted by the ammonium nitrogen measurement whereby the ammonium nitrogen concentration found at an outlet of the nitrification zone feeding into the clarifier is maintained below a predetermined level of about 2 mg/l so as not to adversely affect the nitrification efficiency of the nitrification zone.

2. The process of claim 1 wherein the controlled enrichment of the nitrification zone is restricted to periods when the rate of wastewater flow into the nitrification zone is less than about the average flow rate in order to increase the likelihood that excess nitrification capacity exists in the nitrification zone.

3. The process of claim 1 wherein on a periodic basis, the ammonium nitrogen enrichment is discontinued after a predetermined amount of ammonium nitrogen in the range of about 5 to 40 percent of the average ammonium nitrogen content of the wastewater per period, has been added to the nitrification zone.

4. The process of claim 3 wherein the periodic basis is a daily basis and the period occurs per day.

5. In an activated sludge process for the nitrification of wastewater including a nitrification zone through which the wastewater is continuously passed while being aerated in the presence of activated sludge at a pH of about 6 to 9, and a clarifier in which the nitrified wastewater from the nitrification zone is clarified, the improvement for controlled enrichment of the nitrification zone with ammonium comprising:

(a) a step of measuring the ammonium nitrogen concentration in the wastewater and activated sludge mixed liquor at an outlet of the nitrification zone, and (b) a step of adding an ammonium nitrogen enriching agent consisting essentially of an aqueous ammonium solution derived from anhydrous ammonia to an inlet of the nitrification zone at a controlled rate restricted by the ammonium nitrogen measurement whereby the ammonium nitrogen concentration found at an outlet of the nitrification zone feeding into the clarifier is maintained below a predetermined level of about 2 mg/l so as not to adversely affect the nitrification efficiency of the nitrification zone.

6. The process of claim 5 wherein the controlled enrichment of the nitrification zone is restricted to periods when the rate of wastewater flow into the nitrification zone is less than about the average flow rate in order to increase the likelihood that excess nitrification capacity exists in the nitrification zone.

7. The process of claim 5 wherein on a periodic basis, the ammonium nitrogen enrichment is discontinued after a predetermined amount of ammonium nitrogen in the range of about 5 to 40 percent of the average ammonium nitrogen content of the wastewater per period, has been added to the nitrification zone.

8. The process of claim 7 wherein the periodic basis is a daily basis and the period occurs per day.

* * * * *